United States Patent [19]

Bozung et al.

[11] Patent Number: 4,680,933
[45] Date of Patent: Jul. 21, 1987

[54] CONTROL DEVICE FOR AN INTERNAL COMBUSTION ENGINE WITH AN EXHAUST GAS TURBOCHARGER

[75] Inventors: Hanns-Günther Bozung, Neusäss; Joachim Nachtigal, Hetzles, both of Fed. Rep. of Germany

[73] Assignee: Siemens Aktiengesellschaft, Munich, Fed. Rep. of Germany

[21] Appl. No.: 785,283

[22] Filed: Oct. 7, 1985

[30] Foreign Application Priority Data

Oct. 16, 1984 [DE] Fed. Rep. of Germany ....... 3437872

[51] Int. Cl.$^4$ ............................................. F02B 33/44
[52] U.S. Cl. ......................................... 60/608; 290/52
[58] Field of Search ..................... 60/607, 608; 290/52

[56] References Cited

FOREIGN PATENT DOCUMENTS

| 0079100 | 5/1983 | European Pat. Off. . |
| 2206450 | 8/1973 | Fed. Rep. of Germany . |
| 101540 | 6/1984 | Japan .................................... 60/608 |
| 681204 | 8/1979 | U.S.S.R. .............................. 60/608 |

*Primary Examiner*—Stephen F. Husar
*Attorney, Agent, or Firm*—Kenyon & Kenyon

[57] ABSTRACT

An exhaust gas turbocharger consists of an exhaust gas turbine and a compressor mounted on a common shaft which can be driven by an electric motor controlled via a controller. The controller, which is designed as a computer, receives as control data the control input supplied to the controller of the internal combustion engine as the set value and actual performance values. The controller computes and supplies, from the received control data and from stored values, control signals by which, in the motor-operating mode of the electric motor, the internal combustion engine accelerates as quickly as possible at combustion air ratios optimal for low-smoke combustion and by which, in the generator-operating mode of the electric motor, a maximum of excess exhaust gas energy can be fed to an electric accumulator network as electrical energy via a static converter. The switch from motor to generator operation and vice versa is controlled as a function of a presettable charging air pressure value, or a charging air pressure valve computed by the controller, or of the output of the internal combustion engine.

18 Claims, 1 Drawing Figure

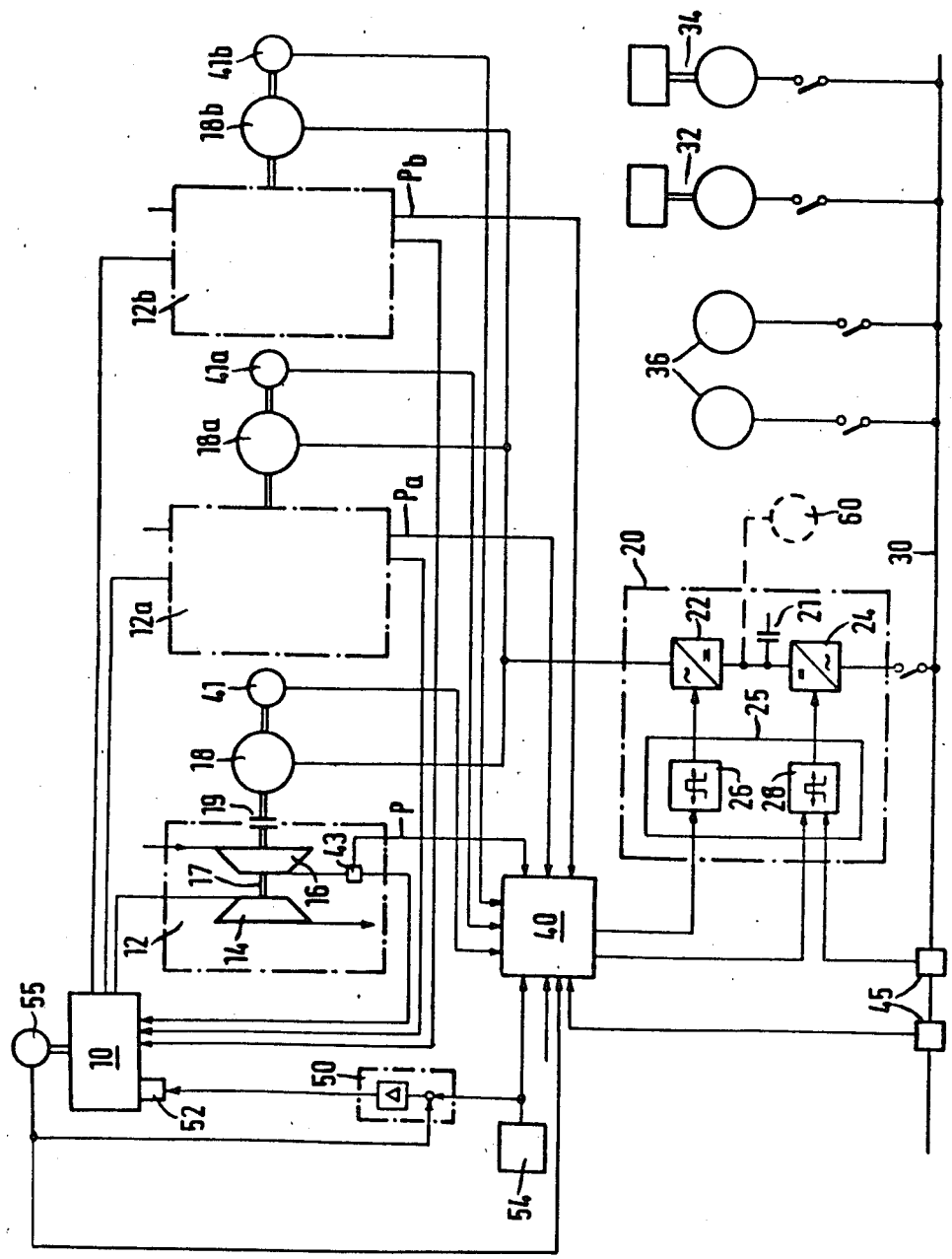

CONTROL DEVICE FOR AN INTERNAL COMBUSTION ENGINE WITH AN EXHAUST GAS TURBOCHARGER

TECHNICAL FIELD

The invention relates generally to a control device for an internal combustion engine. In particular, the invention relates to a control device for an internal combustion engine with an exhaust gas turbocharger.

BACKGROUND OF THE INVENTION

In many applications, it is now common for an internal combustion engine to utilize an exhaust gas turbocharger to improve performance. A turbocharger is a device that uses the exhaust gas of the internal combustion engine to drive a supercharger attached to the engine. The turbocharger usually comprises an exhaust gas turbine and a compressor, both mounted on a common shaft which can be driven by an electric motor. The turbine transfers or switches the electric motor from motor operation to generator operation in the event of excess power in the exhaust gases so to furnish electrical energy to an electric accumulator via a static converter. A control device is fed the actual rotary speed of the turbocharger and the actual voltage of the electric accumulator from respective sensors and an acceleration signal from a transmitter. From the signals provided, the control device forms control signals for the static converter by which the internal combustion engine is accelerated quickly during the motor-operating mode of the electric motor and the power furnished by the electric motor is rectified during the generator-operating mode.

A control device of the type described above is found in the European Patent Office patent document No. EP-A 0079100. The reference discloses that the electrical energy furnished in the generator-operating mode of the electric motor is supplied to a battery acting as the electric accumulator in order to have the energy available again for a subsequent turbocharger acceleration process. Switching the electric motor from motor operation to generator operation and vice versa is accomplished by means of a mechanical or electronic switching relay as a function of the turbocharger speed, the battery voltage and the acceleration signal. During the generator-operating mode, energy is supplied to the battery via an uncontrolled rectifier bridge. During the motor-operating mode, energy from the battery is fed to the stator winding of the electric motor via an inverter controlled by the control device. The rectifier bridge and the inverter may be replaced by a bi-directional static conterter.

Although the aforedescribed control device makes quick acceleration of the internal combustion engine possible, low-smoke combustion and low fuel consumption, which are both desirable and advantageous, are not obtainable for the following reasons. The amount of fuel supplied to an internal combustion engine is directly proportional to the signal emitted by an acceleration transmitter. For smoke-free combustion, i.e. combustion at the optimum fuel/air ratio, the supplied amount of fuel requires a closely defined amount of combustion air. The aforesdescribed control device can produce exhaust gas containing excess energy, however, only at the expense of excess fuel intake to the internal combustion engine. This automatically leads to a fuel/air ratio unfavorable for combustion and, hence, to exhaust gas turbidity. Neither this excess fuel supply nor the resultant fuel/air ratio for the generation of otherwise useable excess exhaust gas energy are desirable. Disadvantageously, the higher amount of fuel also increases the operating costs. Lastly, the worsened exhaust gas composition is usually impermissible, especially from the aspect of the exhaust gas ordinances in force.

Another control device for an internal combustion engine with an exhaust gas turbocharger is described in the German Pat. DE-A No. 22 06 450. The turbocharger comprises an exhaust gas turbine and a compressor mounted on a common shaft. The shaft can be driven by an electric motor controlled so that, in the event of excess power in the exhaust gases, the electric motor is switched from motor operation to generator operation and electrical energy is supplied to a network fed by a supply source. The decisive evaluation and comparison criterion disclosed therein is that the electric motor keeps the speed of the disengaged turbocharger constant in the entire load range of the internal combustion engine by means of an appropriate control device. Thus, the turbocharger compressor always furnishes, regardless of the momentary loading of the internal combustion engine, an output of constant level with the result that the internal combustion engine is always offered a constant amount of air of constant charging air pressure. Consequently, if the internal combustion engine is to be accelerated from idling, for instance, the excess air prevailing in the lower and medium partial load range will force an increased fuel intake to ensure the fuel/air ratio required in the internal combustion engine.

According to another disclosed criterion of the German patent, the control device is designed so that, in the event of excess pwoer at the exhaust gas turbine, the electric motor is switchable to generator operation and electrical energy can then be supplied to the network fed by the supply source. However, assuming that the electric motor in its motor-operating mode drives the turbocharger at constant speed (i.e., for constant charging air pressure and constant amount of charging air) over the entire load range of the internal combustion engine, such a power excess, capable of causing the electric motor to switch from motor to generator operation, in the exhaust gases supplied to the exhaust gas turbine for conversion into electrical energy can be achieved only by an increased fuel intake.

Therefore, it is an object of the invention to improve a control device of the kind defined at the outset so that, in operating an internal combustion engine with less fuel consumption than in previously known arrangements, better acceleration of the internal combustion engine in the partial load range, particularly for starting and in the lower part of the load range, as well as a most favorable conversion of excess exhaust gas energy into electrical energy is possible. It is a further object of the invention that the electrical energy from such a conversion is not to be supplied to a battery, but to a consumer load to be provided and present in the surroundings of the internal combustion engine and whose specific data must also be taken into account in the design of the control device.

SUMMARY OF THE INVENTION

According to the invention, the foregoing problems are obviated by a control device, comprising: (a) a plurality of sensors that detect the instantaneous values of (a) the actual rotary speed of the turbocharger, (b) the actual voltage of the electrical accumulator, (c) the actual frequency of the electric accumulator and (d) the actual charging air pressure of the compressor; and (b) a computer controller which (a) receives as control data the detected values from the plurality of sensors, a control input received by a controller of the internal combustion engine, and engine output data, and (b) computes and supplies from the received control data and from stored values, in particular, from a charging air pressure characteristic or from an input characteristic to the electric motor as a function of the internal combustion engine output, control signals for triggering the static converter by which, in the motor-operating mode of the electric motor, the internal combustion engine accelerates as quickly as possible at combustion air ratios optimal for smokeless combustion and by which, in the generator-operating mode of the electric motor, a maximum yield of electrical energy from the exhaust gas energy can be fed to the electric accumulator or to the independent load, the transferring of the electric motor from motor operation to generator operation and vice versa being controlled as a function of a charging air pressure value preset in the computer controller or of a charging air pressure value computed by the computer controller or of the internal combustion engine output.

The electrical accumulator used with the control device of the present invention can be an electrical network, in particular, a network comprising a plurality of motor-generator sets and loads.

The control device can be used in conjunction with an exhaust gas turbocharger which, due to an optimized blade design of the exhaust gas turbine and the compressor, is of such high efficiency that it is not necessary to utilize the entire amount of exhaust gas available for generating the amount of charging air required in the upper load range of the internal combustion engine, with the charging air pressure required for an optimum combustion air ratio, and the excess exhaust gas energy attainable without increased fuel intake is useable for conversion into electrical energy.

It is possible with such a control device to obtain any desired internal combustion engine acceleration adapted to the desired operating mode, always at the optimized combustion air ratio. As a result of the always optimized combustion air ratio, a noteworthy reduction in fuel consumption is obtained. In addition, due to improved utilization of the energy contained in the exhaust gas, the efficiency of the system is improved considerably in the generator-operating mode because the most advantageous combustion air ratio is always present, even in the higher speed range and load range of the internal combustion engine. The latter is also assured, in particular, with respect to the control device used in conjunction with the above-mentioned turbocharger whose efficiency is so high on account of an optimized blade design of the exhaust gas turbine and the compressor.

This decisive advance achieved by the control device of the present invention has thus become possible only through the optimization of exhaust gas turbochargers. It is of particular advantage, for example, in the application of the internal combustion engine as the means to propel ships, because the electrical energy obtainable from the excess exhaust gas energy through appropriate conversion alone is already sufficient in many cases to adequately supply the entire electrical ship network and the loads connected thereto. This, in turn, makes it possible to design a Diesel-generator set, which is present on board a ship and independent of the internal combustion engine system for generating the electrical energy to cover the basic need of the existing electrical ship network and of the loads connected thereto, smaller with respect to its power output.

BRIEF DESCRIPTION OF THE DRAWINGS

For a better understanding of the invention, reference is made to the following description of an exemplary embodiment thereof and to the accompanying drawing therein:

FIG. 1 is a block diagram of a control device for an internal combustion engine with a plurality of exhaust gas turbochargers.

DETAILED DESCRIPTION

In FIG. 1, an internal combustion engine 10, e.g. one designed as a Diesel engine, has an associated exhaust gas turbocharge 12 comprising an exhaust gas turbine 14 and a compressor 16 mounted on one common shaft 17. The exhaust gas turbocharger 12 can be driven by an electric motor 18 connected to the shaft 17 via a coupling 19. The electric motor 18 is also connected to a static converter 20.

The static converter 20 is expediently designed as a pulsed inverter with an intermediate D.C. link 21. The static converter 20 contains a machine-controlled inverter 22 which is connected to a network-controlled reversing converter 24 via the intermediate D.C. link 21. The inverter 22 is triggered by a first control unit 26 in a converter control 25. Similarly, a second control unit 28 in the converter control 25 is associated with the network-controlled reversing converter 24.

The electric motor 18 is connected via the static converter 20 to an electrical network 30 which is fed by a plurality of Diesel-generator sets 32, 34. A plurality of loads 36, such as heaters, air conditioners, transformers, lights and the like are connected to the network 30.

A controller 40 for the electric motor 18 is designed as a computer. The controller 40 receives from a first sensor 41, designed for instance, as a tachometer generator, a value proportional to the speed of the turbocharger 12 as the actual value and from a second sensor 43, a value proportional to the charging air pressure P as the actual value. In addition, the controller 40 receives from a third sensor 45, and actual value proportional to the voltage and/or frequency of the network 30.

The internal combustion engine 10 is also equipped with a controller 50 to regulate the fuel supply through the fuel injection system 52. The engine output is preset by control input sent via a set point adjuster 54. The control input supplied to the engine controller 50 is also fed to the electric motor controller 40. Note that an engine sensor 55 feeds engine data back to the engine controller 50.

From the set and actual values received and from stored values (in particular, from a charging air pressure P characteristic or a power input characteristic of the electric motor 18 as a function of the output of the internal combustion engine 10), the controller 40 computes and supplies control values for the control units 26, 28 of the static converter 20, by which, the internal combustion engine 10 accelerates as quickly as possible despite the fact that the combustion air ratios are optimal for low-smoke combustion. The control values supplied to the static converter 20 via the control 25 also determine the power output and, hence, the speed of the electric motor 18. Note that the second control unit 28 also receives reference values from the network 30 via the third sensor 45.

In the event of excess power in the exhaust gases, the electric motor 18 is switched from motor to generator operation by appropriate triggering the static converter 20. In the generator-operating mode fo the electric motor 18, a maximum of excess exhaust gas energy can be fed into the network 30 as electrical energy or supplied to a load 60 independent of the network 30. Switching the electric motor 18 from motor to generator operation and vice versa is controlled as a function of a charging air pressure P value preset in the controller 40 or of a charging air pressure P value computed by the controller 40 or of the power output of the internal combustion motor 10. In this process, the control inputs supplied to the static converter 20 determine the output of the electric motor 18 operating as a generator.

Special advantages result from using the controller 40 in conjunction with an exhaust gas turbocharger 12 whose efficiency due to optimized turbine 14 and compressor 16 blade design is such that not all of the available exhaust gas energy is used to generate the amount of charging air and the charging air pressure required in the upper load range of the internal combustion engine 10 and that the excess exhaust gas energy thus available without increased fuel intake can be utilized for conversion into electrical energy. An optimization is achieved, for example, by using compressor impellers with blades curved backwards and/or adjustable diffusers.

Depending on the rate output or number of cylinders of the internal combustion engine 10, several exhaust gas turbochargers may be used. As shown in FIG. 1, the internal combustion engine 10 has, in addition to the first turbocharger 12, a plurality of exhaust gas turbochargers 12a, 12b which are triggered jointly by the electric motor controller 40 and whose respective electric motors 18a, 18b are operated via the common static converter 20.

If the plurality of electric motors are designed as asynchronous motors, they act like ordinary machines connected to a common network when voltage and frequency are changed. However, the electric motors may also be synchronous machines, in particular, permanent magnet-excited synchronous motors.

It is purposeful to equip each electric motor 18, 18a, 18b with a spray oil cooling system. This makes for a compact design and makes installation, for example, in the intake muffler of the respective exhaust gas turbocharger 12, 12a, 12b possible.

It is to be understood that the embodiments described herein are merely illustrative of the principles of the invention. Various modifications may be made thereto by persons skilled in the art without departing from the spirt and scope of the invention.

What is claimed is:

1. A control device for an internal combustion engine with an exhaust gas turbocharger having an exhaust gas turbine and a compressor both mounted on a common shaft, which can be driven by an electric motor, said turbine transferring the electric motor from motor operation to generator operation in the event of excess power in the exhaust gases so as to furnish electrical energy from the electric motor to an electric accumulator, or an independent load, via a static converter, comprising:

(a) a plurality of sensors that detect the instantaneous values of (a) the actual rotary speed of the turbocharger, (b) the actual voltage of the electric accumulator, (c) the actual frequency of the electric accumulator, and (d) the actual charging air pressure of the compressor; and (b) a computer controller which (a) receives as control data the detected values from the plurality of sensors, a control input received by a controller of the internal combustion engine, and engine output data, and (b) computes and supplies from the control data received and from stored values, in particular, from a charging air pressure characteristic or from an input characteristic to the electric motor as a function of the output of the internal combustion engine, control signals for the static converter by which, in the motor-operating mode of the electric motor, the internal combustion engine accelerates as quickly as possible at combustion air ratios optimal for low-smoke combustion, and by which, in the generator-operating mode of the electric motor, a maximum yield of electrical energy from the excess exhaust gas energy can be fed to the electric accumulator or to the independent load, the transferring of the electric motor from motor operation to genertor operation and vice versa being controlled as a function of a charging air pressure value preset in the computer controller and the computer controller being usable in conjunction with an exhasut gas turbocharger which, due to optimized exhaust gas turbine and compressor blade design, is of such high efficiency that it is not necessary to utilize the entire amount of exhaust gas available for generating the amount of charging air required in the upper load range of the internal combustion engine, with the charging air pressure required for an optimum combustion air ratio, and that the exhaust gas energy attainable without increased fuel intake can be utilized for conversion into electrical energy.

2. The control device as set forth in claim 1, wherein: the electric accumulator is an electrical network comprising a plurality of motor-generator sets and laods.

3. The control device as set forth in claim 1, wherein: the electric motor comprises an asynchronous machine.

4. The control device as set forth in claim 1, wherein: the electric motor comprises a permanent magnet-excited synchronous motor.

5. The control device as set forth in claim 2, wherein: the electric motor comprises an asynchronous machine.

6. The control device as set forth in claim 2, wherein: the electric motor comprises a permanent magnet-excited synchronous motor.

7. A control device for an internal combustion engine with an exhaust gas turbocharger having an exhaust gas turbine and a compressor both mounted on a common shaft, which can be driven by an electric motor, said turbine transferring the electric motor from motor operation to generator operation in the event of excess power in the exhaust gases so as to furnish electrical energy from the electric motor to an electric accumulator, or an independent load, via a static converter, comprising:

(a) a plurality of sensors that detect the instantaneous values of (a) the actual rotary speed of the turbocharger, (b) the actual voltage of the electric accumulator, (c) the actual frequency of the electric accumulator and (d) the actual charging air pressure of the compressor; and (b) a computer controller which (a) receives as control data the detected values from the plurality of sensors, a control input received by a controller of the internal combustion engine, and engine output data and (b) computes and supplies from the control data received and from stored values, in particular, from a charging air pressure characteristics or from an input characteristic to the electric motor as a function of the output of the internal combustion engine, control signals for the static converter by which, in the motor-operating mode of the electric motor, the internal combustion engine accelerates as quickly as possible at combustion air ratios optimal for low-smoke combustion, and by which, in the generator-operating mode of the electric motor, a maximum yield of electrical energy from the excess exhaust gas energy can be fed to the electric accumulator or to the independent load, the transferring of the electric motor from motor to operation generator operation and vice versa being controlled as a function of a charging air pressure value computed by the computer controller and the computer controller being usable in conjunction with an exhaust gas turbocharger which, due to optimized exhaust gas turbine and compressor blade design, is of such high efficiency that it is not necessary to utilize the entire amount of exhaust gas available for generating the amount of charging air required in the upper load range of the internal combustion engine, with the charging air pressure required for an optimum combustion air ratio, and that the excess exhaust gas energy attainable without increased fuel intake can be utilized for conversion into electrical energy.

8. The control device as set forth in claim 7, wherein: the electric accumulator is an electrical network comprising a plurality of motor-generator sets and loads.

9. The control device as set forth in claim 7, wherein: the electric motor comprises an asynchronous machine.

10. The control device as set forth in claim 7, wherein: the electric motor comprises a permanent magnet-excited synchronous motor.

11. The control device as set forth in claim 8, wherein: the electric motor comprises an asynchronous machine.

12. The control device as set forth in claim 8, wherein: the electric motor comprises a permanent magnet-excited synchronous motor.

13. A control device for an internal combustion engine with an exhaust gas turbocharger having an exhaust gas turbine and a compressor both mounted on a common shaft, which can be driven by an electric motor, said turbine transferring the electric motor from motor operation to generator operation in the event of excess power in the exhaust gases so as to furnish electrical energy from the electric motor to an electric accumulator, or an independent load, via a static converter, comprising:

(a) a plurality of sensors that detect the instantaneous values of (a) the actual rotary speed of the turobcharger, (b) the actual voltage of the electric accumulator, (c) the actual frequency of the electric accumulator, and (d) the actual charging air pressure of the compressor; and (b) a computer controller which (a) receives as control data the detected values from the plurality of sensors, a control input received by a controller of the internal combustion engine, and engine output data, and (b) computes and supplies from the control data received and from stored values, in particular, from a charging air pressure characteristic or from an input characteristic to the electric motor as a function of the output of the internal combustion engine, control signals for the static converter by which, in the motor-operating mode of the electric motor, the internal combustion engine accelerates as quickly as possible at combustion air ratios optimal for low-smoke combustion, and by which, in the generator-operating mode of the electric motor, a maximum yield of electrical energy from the excess exhaust gas energy can be fed to the electric accumulator or to the independent load, the transferring of the electric motor from motor operation to generator operation and vice versa being controlled as a function of the internal combustion engine output and the computer controller being usable in conjunction with an exhaust gas turbocharger which, due to optimized exhaust gas turbine and compressor blade design, is of such high efficiency that it is not necessary to utilized the entire amount of exhaust gas available for generating the amount of charging air required in the upper load range of the internal combustion engine, with the charging air pressure required for an optimum combustion air ratio, and that the exhaust gas energy attainable without increased fuel intake can be utilized for conversion into electrical energy.

14. The control device as set forth in claim 13, wherein: the electric accumulator is an electrical network comprising a plurality of motor-generator sets and loads.

15. The control device as set forth in claim 13, wherein: the electric motor comprises an asynchronous machine.

16. The control device as set forth in claim 13, wherein: the electric motor comprises a permanent magnet-excited synchronous motor.

17. The control device as set forth in claim 14, wherein: the electric motor comprises an asynchronous machine.

18. The control device as set forth in claim 14, wherein: the electric motor comprises a permanent magnet-excited synchronous motor.

* * * * *